United States Patent [19]

Rozentals

[11] 3,759,589

[45] Sept. 18, 1973

[54] ROD END BEARING ASSEMBLY

[75] Inventor: Alfreds Rozentals, Fairfield, Conn.

[73] Assignee: Heim Universal Corporation, Fairfield, Conn.

[22] Filed: June 30, 1972

[21] Appl. No.: 268,006

[52] U.S. Cl. .................................................. 308/72
[51] Int. Cl. ............................................ F16c 23/04
[58] Field of Search ....................................... 308/72

[56] References Cited
UNITED STATES PATENTS 3,614,182  10/1972  Rozentals.............................. 308/72

Primary Examiner—Charles J. Myhre
Assistant Examiner—Frank Susko
Attorney—John R. Bronaugh et al.

[57] ABSTRACT

A self-aligning, spherical rod end bearing assembly comprising a first and second housing member, each of said housing members having circular openings therethrough with each opening being defined by a spherical seating portion, a spherical ball rotatably enclosed within said housing member and in alignment with said openings and seated on said seating portions, fastening means fixedly attached to said housing member for threadably supporting said spherical rod end bearing assembly in an operational position, a separate interlocking channel member having integral lip portions adapted to mechanically grasp holding means formed on both of said housing members to mechanically interlock said housing members together.

7 Claims, 5 Drawing Figures

PATENTED SEP 18 1973 3,759,589
Fig. 1. Fig. 2. Fig. 3.
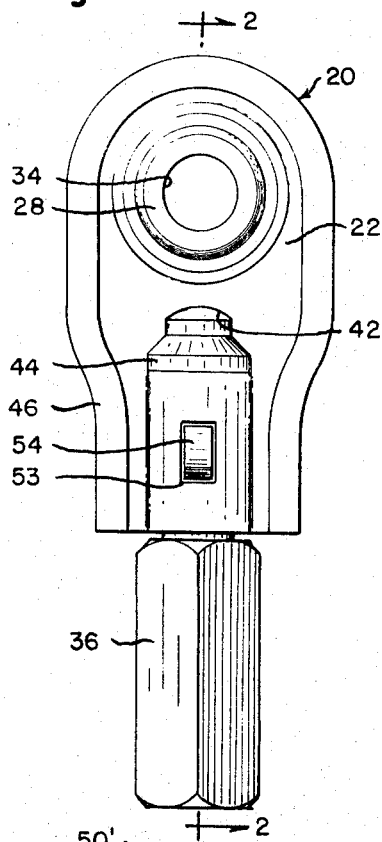
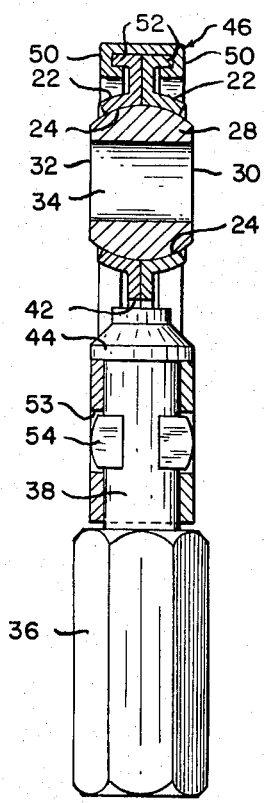
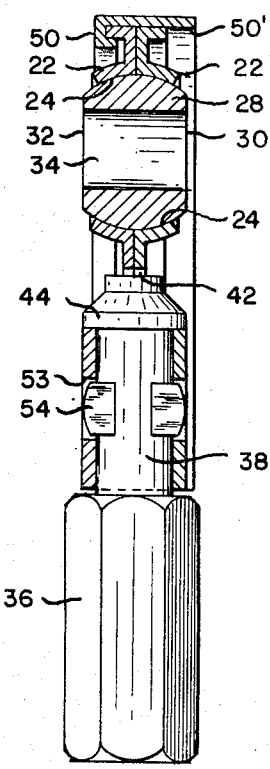
Fig. 4.
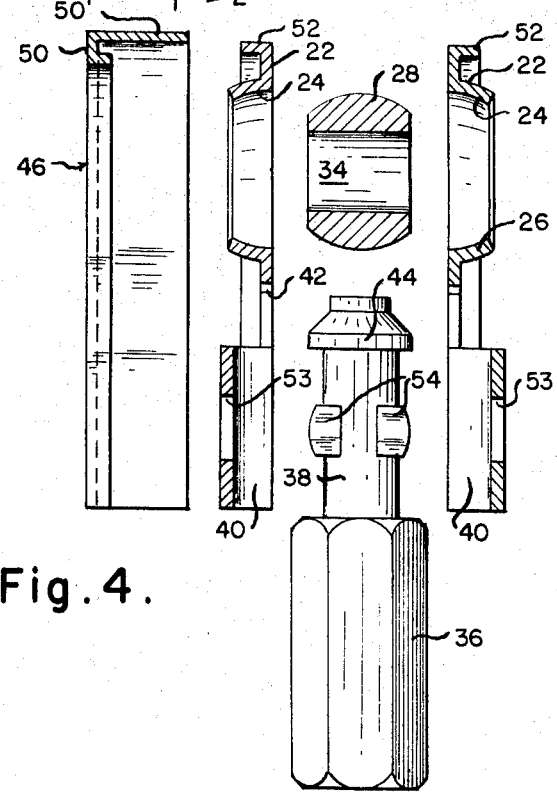
Fig. 5.
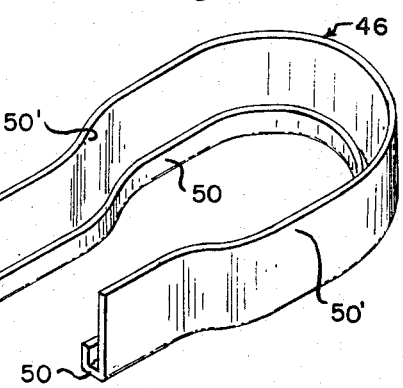

ROD END BEARING ASSEMBLY

BACKGROUND OF THE INVENTION

This invention relates to spherical bearing assemblies, including rod end spherical bearings and pillow block bearings, and the like, having high load carrying capacities for use in a wide variety of operational uses and environments where durability and long life are both expected and required.

This invention represents an improvement on my previously filed invention concerning rod end spherical bearing assemblies, now U. S. Pat. No. 3,614,182 filed Dec. 22, 1969 and issued on Oct. 19, 1971.

Rod end bearings, for example, have found wide acceptance in the aircraft industry where their superior self-aligning characteristics and durability have greatly improved the reliability and safety of control system linkages.

Rod end bearings have also found similar acceptance in linkages of certain systems on road vehicles and marine vessels.

However, there are many instances where their applications have been limited or precluded due to cost or quality considerations. Typically in the past, acceptable quality spherical bearings required complicated, precise, and expensive machining and assembly operations.

The major thrust of the prior art in attempting to resolve this problem was in reducing the machining operations. One such example of the prior art involved the use of an extruded tube in which the spherical ball was inserted and the tube was deformed about the ball and shaped into a rod end bearing assembly. Another typical prior art approach, as for example, U. S. Pat. No. 3,461,529 to H. B. Van Dorn, issued Aug. 19, 1969, involves the use of a sleeve placed about a molding mass. This, of course, results in an inherently weak bearing assembly. Other examples involved the use of stamped housings welded or riveted together.

While much of the prior art is directed toward the same problems that the present invention is directed toward, they all failed to achieve a simplified and inexpensive spherical bearing asembly capable of carrying sustained heavy loading during operational use. The prior art can be characterized as being either as expensive as their predecessor bearings (in some cases even more expensive) and/or lacking the necessary strength, reliability, and/or durability.

Accordingly, it is the general object of the present invention to provide a spherical bearing assembly which will be inexpensive to manufacture and will equal or exceed the life, reliability, and load carrying characteristics of, and be generally and totally interchangeable with, the "machined" type spherical bearing.

It is a further object of this invention to provide a spherical bearing which is assembled by mechanically interlocking two easily fabricated housings by utilizing an interlocking channel member in a simplified assembly operation.

It is yet another object of this invention to provide a spherical rod end bearing of the self-aligning type having two housing members, each of the housing members having semi-circular portions defining a cylindrical groove and matching circular openings through the housing members, each of the openings being defined by a spherical seating portion, a spherical ball rotatably enclosed within said housings and in alignment with said openings and seated on said seating portions, a stud fixedly enclosed within said housing at the cylindrical groove, a separate interlocking channel member having lip portions adapted to mechanically grasp portions of the housing members for mechanically interlocking the two housing members together.

Still another object of this invention is to provide a method of making an inexpensive, sheet metal, mechanically interlocked, spherical bearing assembly which accomplishes the above objectives.

Other objects and advantages of the invention will become apparent as the present invention is better understood from the following disclosure and as shown in the accompanying drawings.

DESCRIPTION OF THE DRAWINGS

FIG. 1 is a plan view of a mechanically interlocked self-aligning spherical bearing assembly in accordance with the present invention;

FIG. 2 is a longitudinal section taken on line 2—2 of the bearing assembly of FIG. 1;

FIG. 3 is a plan view of the bearing assembly of FIG. 1 in a partly assembled state;

FIG. 4 is a plan view of the bearing assembly of FIG. 1 in an disassembled state;

FIG. 5 is a perspective view of the interlocking channel member used to interlock the bearing assembly of FIG. 1.

DETAILED DESCRIPTION OF THE INVENTION

Referring more particularly to the drawings, FIGS. 1 through 5 show a self-aligning, rod end spherical bearing assembly embodying the concept of the present invention, wherein the rod end bearing is generally designated 20.

The rod end spherical bearing 20, which has superior load carrying characteristics, has two identical housing members 22. The housing members 22 are preferably of stamped sheet steel, such as stamped stainless steel, aluminum, brass, or the like. They may be heat treated and coated with antirust or hardness materials, as, for example, the housing members may be nickel-chromium plated.

Housing members 22 have a circular opening 24 therethrough which is defined by a spherical seating portion 26.

A spherical ball 28 is rotatably enclosed within the housing members 22 and in alignment with the openings 24 and seated on the spherical seating portions 26. The spherical ball 28 may have opposing truncated surfaces 30 and 32 with a central bore 34 therethrough, and the bore 34 is adapted for receiving any rod or shaft (not shown).

If desired, the spherical ball 28 and the spherical seating portions 26 could be lined with a self-lubricating plastic, as, for example, Teflon.

A stud 36 is also enclosed within the housing members 22. The stud 36 is provided to fasten the bearing unit in an operational position, as, for example, for interconnecting the bearing assembly to a linkage system. The shank portion 38 of the stud 36 is disposed within a cylindrical groove, which is defined by the semi-cylindrical portions 40 of the housing members 22.

The semi-cylindrical portions 40 emanate from openings 42 in housing members 22. The openings 42 may be shaped in a manner to receive the head 44 of the stud 36, as will be described in further detail below.

The rod end spherical bearing 20 is also provided with a separate interlocking channel member 46. The interlocking channel member could be machined or otherwise suitably formed into a preformed shape as shown in FIG. 5. The channel member 46 in this preformed state could be used as the "base" for assembling on an automated basis the various bearing parts into a partly assembled state, as shown in FIG. 3. The preformed lip 50 of the channel member 46 would engage one housing lip 52 provided along the outer periphery of the housing members 22. The unformed lip 50' could then be deformed by a suitable deforming means as, for example, by a suitably rolling apparatus (not shown). Rollers of the apparatus could be employed to reform the undeformed lip 50' about the housing lip 52 to effect the mechanical interlocking of the rod end spherical bearing assembly as shown in FIG. 2. Accordingly, the bearing 20 may be assembled in progressive steps of assembling the various components about the channel member 46 and then deforming the undeformed lip 50' about the housing lip 52.

The channel member 46 could have, of course, both lips undeformed and both such undeformed lips could be deformed about the housing lips 52.

The channel member 46 could be fabricated by a number of methods of metal working as for example, stamping, extrusion, or the like. Typically, the channel member would be heated treated after the bearing 20 was assembled.

Additionally, the deforming of the lip 50' could be done in progressive steps to reduce the stresses in the material of the channel member 46.

The semi-cylindrical portions 40 which form the cylindrical groove, may also be provided with openings 53 for receiving ribbed portions 54 on the shank 38 of the stud 36. The ribbed portions 42 resist rotation of the stud 36 as well as impart furthur mechanical rigidity to the entire bearing assembly.

As indicated above, a rod end spherical bearing is provided with a stud 36, which may be selected from a variety of shapes and sizes, depending upon, among other things, the function the bearing is to serve. In most applications of the bearing, it is desirable that the bearing be fixedly secured within the bearing housing. To that end, the head 44 may be shaped in such a manner that lips (not shown) are formed in the head for grasping the two housing members 22. The lips thereby impart further mechanical rigidity to the bearing assembly and compliment the action of the separate interlocking channel member 46. The lips will also resist rotational movement of the stud 36, which assists and compliments the antirotational action of the ribbed portions 54.

In some applications, however, rotation of the stud 43 may be desired, such as where excessive spherical ball misalignment is needed. Then, of course, lips on the head 44, as well as the slotted openings 42 and the ribbed portions 54, may be omitted.

In some other applications it may be desired to omit the stud 36 altogether and to provide for internal threading to be applied directly to the cylindrical groove of the housing members 22. In this regard openings 42 and 53 may also be omitted. The overall length of such a bearing assembly will then be only as long as the overall length of the assembled housing members 22.

The stud 36 of the rod end spherical bearing of FIG. 1 is a female-type, that is, the stud 36 is internally threaded. The stud 36 could be, in the alternative, a male end (externally threaded).

Suitable means may be provided for the lubrication of the ball 24. As suggested above, the ball 28 or the seating portions may be lined with a self-lubricating plastic, such as Teflon, or further a self-lubricating intermediate liner (not shown) could also be utilized. Suitable grease fittings could be attached (not shown) to provide grease or other suitable lubrication at the bearing surface.

Obviously, the present invention is not limited to the specific details as herein described, but is capable of other modifications and changes without departing from the spirit and scope of the appended claims.

I claim:

1. A self-aligning, spherical rod end bearing assembly comprising first and second housing members, each of said housing members having circular openings therethrough with each opening being defined by a spherical seating portion, a spherical ball rotatably enclosed within said housing members and in alignment with said openings and seated on said seating portions, fastening means fixedly attached to said housing members for threadably supporting said spherical rod end bearing assembly in an operational position, a separate interlocking channel member having integral lip portions adapted to mechanically grasp holding means formed on both of said housing members to mechanically interlock said housing members together.

2. A self-aligning spherical bearing assembly as set forth in claim 1 in which said holding means includes a lip provided along the outer periphery of said housing members.

3. A self-aligning spherical bearing assembly as set forth in claim 2 in which said first and second housing members are identical in shape.

4. A self-aligning spherical bearing assembly as set forth in claim 2 in which one of said lips of said channel member is preformed and shaped to generally conform to the lips provided on each of said housing members.

5. A self-aligning spherical bearing assembly as set forth in claim 1 in which said fastening means includes a stud member fixedly attached to said housing members, said stud member being provided with internal threads.

6. A self-aligning spherical bearing assembly as set forth in claim 1 in which said fastening means includes a stud member fixedly attached to said housing members, said stud member being provided with external threads.

7. A self-aligning spherical bearing assembly as set forth in claim 1 in which said housing members have semi-cylindrical portions defining a cylindrical groove and said fastening means includes threads applied to said cylindrical groove.

* * * * *